(12) United States Patent
Henderson et al.

(10) Patent No.: US 6,721,842 B2
(45) Date of Patent: Apr. 13, 2004

(54) BOUNDARY ADDRESSABLE MEMORY (75) Inventors: Alex E. Henderson, Hillsborough, CA (US); Walter E. Croft, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 10/005,986

(22) Filed: Nov. 7, 2001

(65) Prior Publication Data

US 2004/0015648 A1 Jan. 22, 2004

Related U.S. Application Data (63) Continuation-in-part of application No. 09/240,919, filed on Jan. 29, 1999.
(60) Provisional application No. 60/246,795, filed on Nov. 7, 2000.

(51) Int. Cl.$^7$ ................................................ G06F 12/00
(52) U.S. Cl. ..................... 711/101; 711/105; 711/108
(58) Field of Search ................................ 711/101, 105, 711/108

(56) References Cited

U.S. PATENT DOCUMENTS

| | | | |
|---|---|---|---|
| 3,845,465 A | 10/1974 | Hosick et al. | |
| 4,627,024 A | 12/1986 | Whalen et al. | |
| 4,760,374 A | 7/1988 | Moller | |
| 5,509,006 A | 4/1996 | Wilford et al. | |
| 5,561,429 A | 10/1996 | Halberstam et al. | |
| 5,574,910 A | 11/1996 | Bialkowski et al. | |
| 5,608,662 A | 3/1997 | Large et al. | |
| 5,761,424 A | 6/1998 | Adams et al. | |
| 5,802,054 A | 9/1998 | Bellenger | |
| 5,884,033 A | 3/1999 | Duvall et al. | |
| 2002/0093347 A1 * | 7/2002 | Henderson et al. | 324/678 |
| 2003/0152078 A1 * | 8/2003 | Henderson et al. | 370/389 |
| 2003/0154328 A1 * | 8/2003 | Henderson et al. | 710/1 |

FOREIGN PATENT DOCUMENTS

WO   WO 94/01828 A1   1/1994

* cited by examiner

Primary Examiner—Reba I. Elmore
(74) Attorney, Agent, or Firm—Kerry D. Tweet (57) ABSTRACT A boundary addressable memory (BAM) array comprises a plurality of BAM word modules, each BAM word module comprises a plurality of BAM cells for performing arithmetic comparisons between input data and an upper bound value and a lower bound value stored in each BAM cell to generate a matching signal indicating whether the input data is not greater than the upper bound value and not less than the lower bound value or whether the input data is not greater than the lower bound value and not less than the upper bound value.

25 Claims, 12 Drawing Sheets

BOUNDARY ADDRESSABLE MEMORY

RELATED APPLICATION

This application is a continuation-in-part and claims priority from U.S. patent application Ser. No. 09/240,919 entitled "System and Method for Filtering Data" by Alex E. Henderson and Walter E. Croft, filed Jan. 29, 1999.

This application also claims priority under 35 U.S.C. § 119(e) to U.S. Provisional Application No. 60/246,795, filed Nov. 7, 2000, and entitled "Boundary Addressable Memory" by Alex E. Henderson and Walter E. Croft, which is incorporated by reference herein in its entirety.

FIELD OF THE INVENTION

The present invention relates generally to semiconductor memories, and more specifically to a boundary addressable memory (BAM) device.

BACKGROUND OF THE INVENTION

In a computer network, data transferred from one network device to another network device via the computer network is typically broken down into small blocks of data called packets. Packet filtering is a basic requirement of networking devices, such as routers, upper layer switches, firewalls, bandwidth managers, and similar devices.

A content addressable memory (CAM) device is a well-known semiconductor device that is used to perform data filtering in classification systems. A CAM permits the contents of the memory to be searched and matched instead of having to specify one or more particular memory locations to retrieve data from the memory. One example of an application in which CAM devices are often used is to search a routing table to look for a matching destination address, such as an Internet Protocol (IP) destination address, so that data may be routed to the appropriate destination address. After the matching address is identified, it is often required to apply additional filtering criteria to determine whether the matching address falls within a certain range. Range checking has applications in computer networking, such as checking for port number ranges and valid length and type values in Ethernet MAC headers. Implementing range checking for a non-binary CAM, however, requires multiple entries. Having multiple entries would make routing very expensive and space inefficient. Moreover, CAM-like memory devices search for matching data by looking up the entire area in memory in multiple cycles, thereby increasing latency.

Therefore, what is needed is a memory device for performing arithmetic range checking.

SUMMARY OF THE INVENTION

The present invention overcomes the deficiencies and limitations of the prior art with a boundary addressable memory (BAM) device for performing arithmetic range checking in classification systems. The present invention is particularly advantageous because it performs arithmetic comparisons using a range check, instead of performing CAM-like equality comparisons. Arithmetic range checking provides a method for matching an input value that is greater than or equal to a stored lower bound value and at the same time less than or equal to an upper bound value.

The BAM device of the present invention comprises an array of BAM word modules. Each BAM word module includes a plurality of BAM cells. In a preferred embodiment of the present invention, each BAM cell includes a memory cell that stores an $n^{th}$ bit of an upper bound value and a memory cell that stores an $n^{th}$ bit of a lower bound value. The BAM cell further includes an upper bound comparator for performing arithmetic comparisons between the $n^{th}$ bit of the upper bound value and the $n^{th}$ bit of the input data. The BAM cell also includes a lower bound comparator for performing arithmetic comparisons between the $n^{th}$ bit of the lower bound value and the $n^{th}$ bit of the input data.

In a preferred embodiment of the present invention, a search of the BAM device for a BAM word with a lower bound value less or equal to the input data and an upper bound value greater than equal to the input data occurs in the following manner. An $n^{th}$ bit of the input data is provided to both the upper bound comparator and the lower bound comparator. The upper bound comparator compares the $n^{th}$ bit of the input signal with the $n^{th}$ bit of the stored upper bound value. Simultaneously, the lower bound comparator compares the $n^{th}$ bit of the input data with the $n^{th}$ bit of the stored lower bound value. The comparisons are performed bit-by-bit and propagate down all the way from the highest order bit to the lowest order bit. As a result, a BAM word asserts a signal indicating whether the input data is less than or equal to the upper bound value and greater than or equal to the low bound value or the input data is greater than or equal to the upper bound value and less than or equal to the low bound value.

A logic gate is coupled to receive the less than or equal and greater than or equal outputs of each BAM word module and to generate a matching signal in response to the received outputs. In one embodiment of the present invention, the matching signal indicates that the input data falls within the range specified by the upper bound value and the lower bound value. In another embodiment, the matching signal indicates that the input data falls outside the range specified by the upper bound value and the lower bound value.

These and other features and advantages of the present invention may be better understood by considering the following detailed description of a preferred embodiment of the invention. In the course of the description, reference will frequently be made to the attached drawings.

DETAILED DESCRIPTION OF THE INVENTION

Figure 1:
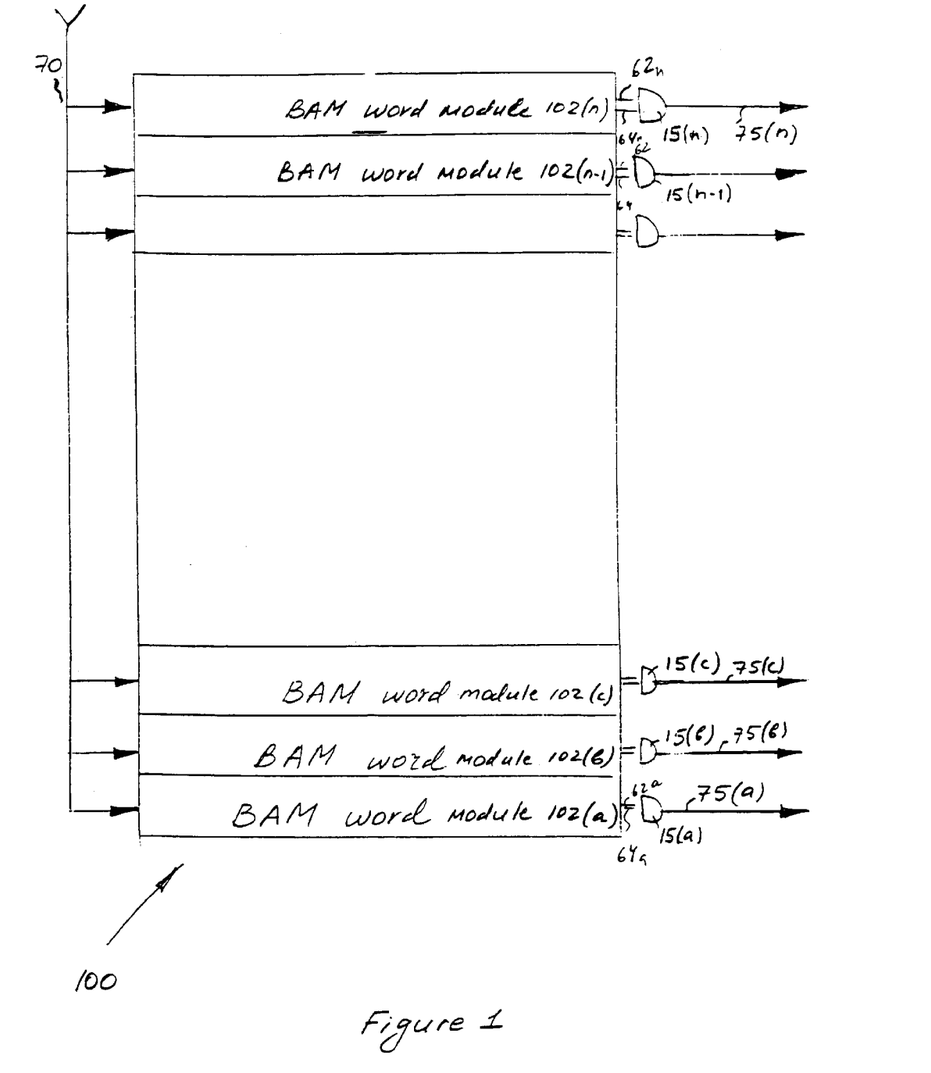
FIG. 1 is a high-level block diagram of an embodiment of a boundary addressable memory (BAM) array comprising a plurality of BAM word modules.

Referring now to FIG. 1, a high-level block diagram of an embodiment of a boundary addressable memory (BAM) array 100 according to an embodiment of the present invention is shown. The BAM array 100 comprises a plurality of BAM word modules 102(a)–102(n), wherein (n) indicates the number of BAM word modules 102 in the array 100. Each BAM word module 102(a)–102(n) comprises a plurality of BAM cells 50(a)–(n), an example of which is shown in more detail below in FIG. 3. Each BAM cell 50(a)–(n) stores an upper bound bit and a lower bound bit, as shown below in connection with FIGS. 3–7. Each upper bound bit and lower bound bit are arbitrary values used to perform range checking in the BAM array 100. Each BAM word module 102(a)–102(n) is capable of performing arithmetic comparisons between input data provided on signal line 70 and a corresponding upper bound bit and lower bound bit stored in each BAM cell 50(a)–(n) of BAM word module 102(a)–102(n). Each BAM word module 102(a)–102(n) preferably outputs a less than or equal signal on signal line 62(a)–62(n) and greater than or equal signal on signal line 64(a)–64(n). A logic gate 15(a)–15(n) is coupled to receive the less than or equal signal and greater than or equal signal on signal lines 62(a)–62(n) and 64(a)–64(n) respectively from each BAM word module 102(a)–102(n) and to generate a matching signal on a respective signal line 75(a)–75(n). In one embodiment of the present invention, the matching signal asserts high when it indicates that the input data provided on signal line 70 is not greater than the upper bound value and not less than the lower bound value stored in the BAM word 102(a)–102(n). In another embodiment of the present invention, the matching signal asserts high when it indicates that the input data provided on signal line 70 is not less than the upper bound value and not greater than the lower bound value. Bit lines for reading and writing upper bound values and lower bound values into each BAM word 102(a)–102(n) are not shown because they are conventional and understood by those skilled in the art.

Figure 2:
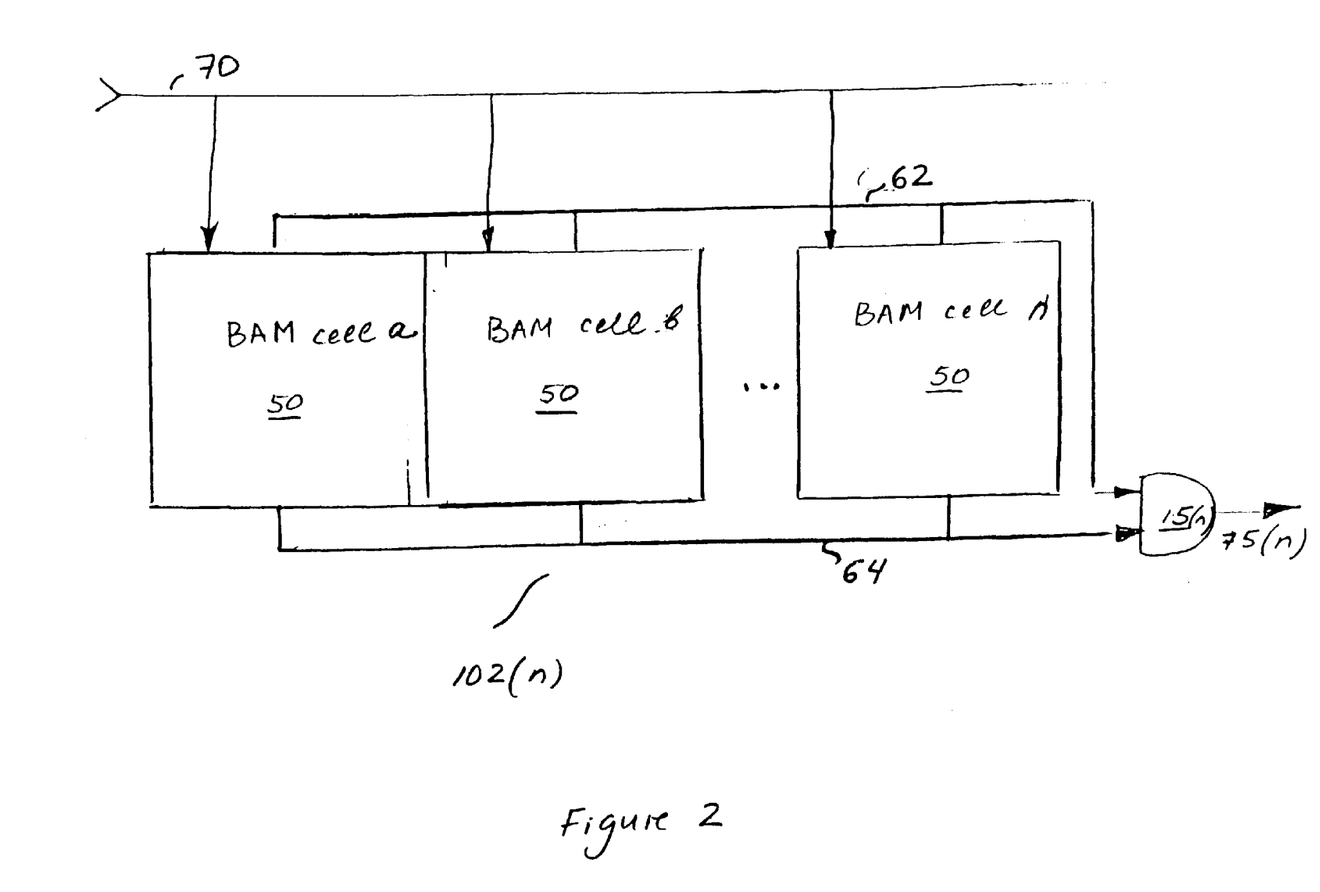
FIG. 2 is a high-level block diagram of an embodiment of one BAM word module of the embodiment of FIG. 1 comprising a plurality of BAM cells.

Referring now to FIG. 2, one BAM word module 102(n) is shown. BAM word module 102(n) comprises a plurality of BAM cells 50(a)–(n). The present invention is implemented as a 32-bit BAM word module in a preferred embodiment and thus would have 32 BAM cells 50. However, those skilled in the art will realize that BAM word module 102(n) can be of any size. As shown in FIG. 2, BAM word module 102(n) is broken into a plurality of BAM cells 50(a)–(n) for performing arithmetic comparisons between the input value provided on signal line 70 and the $n^{th}$ bit of the upper bound value and the $n^{th}$ bit of the lower bound value stored in each BAM cell 50(n).

In a preferred embodiment, each BAM cell 50(a)–(n) evaluates one most significant bit at a time. Comparisons are performed in each BAM cell 50(a)–(n) and propagate in a daisy chain all the way from the highest order bit to the lowest order bit. Each BAM cell 50(a)–(n) is coupled to wired OR signal lines 62, 64. If any of the BAM cells 50(a)–(n) is high, high signals are asserted on signal lines 62, 64, and comparisons for lower order bits are suspended. Logic gate 15(n) is coupled to the less than equal signal line 62 for receiving less than equal signal. Logic gate 15(n) is further coupled to the greater than equal line 64 for receiving greater than equal signal. In a preferred embodiment of the present invention, logic gate 15(n) performs an AND function on both inputs and asserts a matching signal on signal line 75(n). Logic gate 15 asserts "high" on its respective signal line 75(n) when both less than equal and greater than equal signal are high. In one embodiment of the present invention, both less than equal and greater than equal signals are high when the input signal is not greater than the upper bound value and at the same time is not less than the lower bound value for at least one BAM cell 50(a)–(n). In another embodiment of the present invention, both signals are "high" when the input signal is not less than the upper bound value and at the same time is not greater that the lower bound value for at least one BAM cell 50(a)–(n). Otherwise, logic gate 15(n) asserts a "false" or "0" at its output 75(n).

Figure 3:
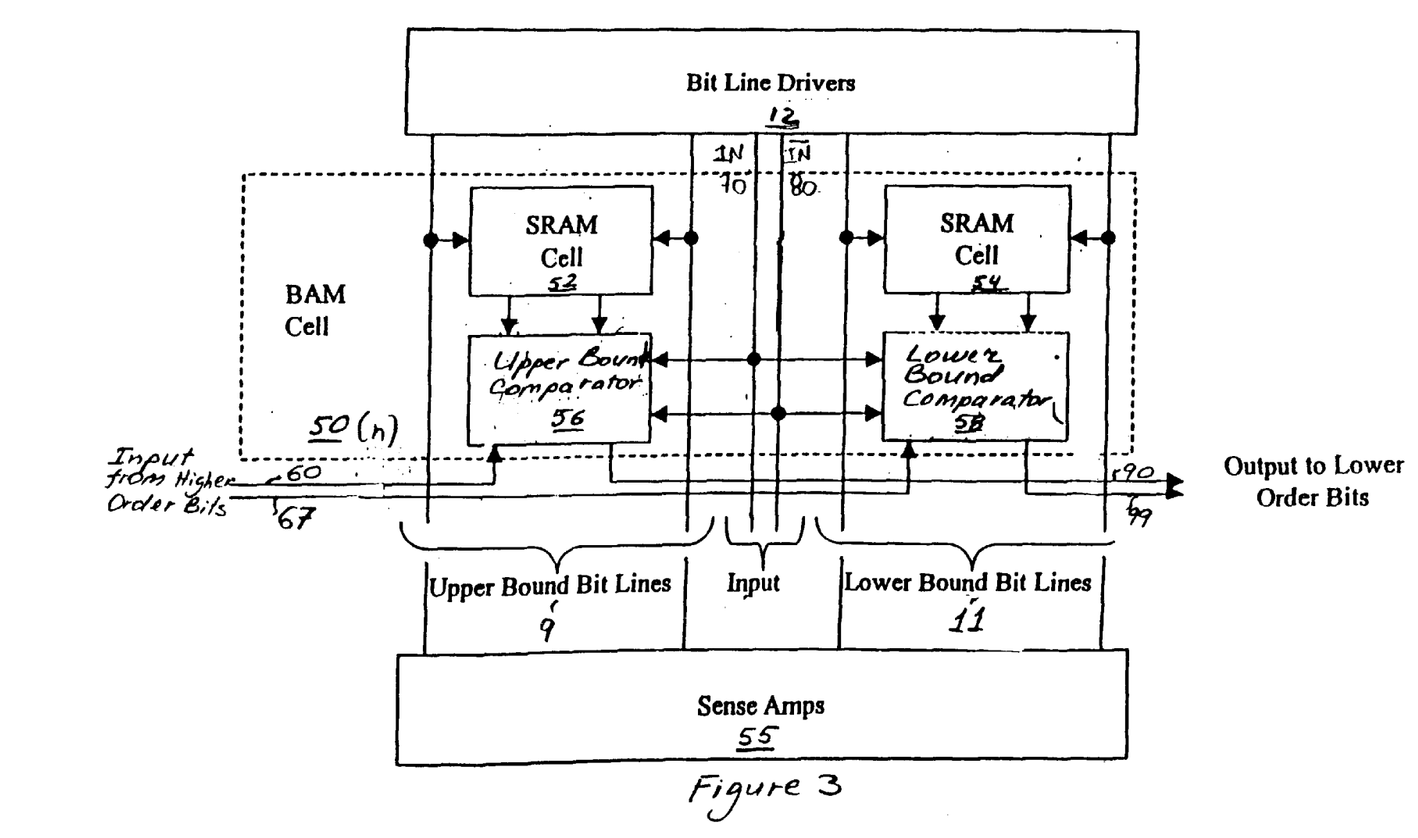
FIG. 3 is a high-level block diagram of an embodiment of one BAM cell of the BAM word module of the embodiment of FIG. 2.

Referring now to FIG. 3, it shows a preferred embodiment of BAM cell 50(n) of the BAM word 102(n) shown in FIG. 2. An example BAM cell 50(n) includes a plurality of typical six-transistor SRAM memory cells 52 and 54, an upper bound comparator 56, and a lower bound comparator 58. Upper bound bit lines 9 are conventional bit lines for reading and writing upper bound values into SRAM cell 52. Lower bound bit lines 11 are conventional bit lines for reading and writing lower bound values into SRAM cell 54. Bit line drivers 12 drive upper bound values and lower bound values to SRAM cells 52, 54 and IN and IN_N values to the comparators 56, 58. Upper bound comparator 56 is coupled to SRAM cell 52 to receive upper bound values from SRAM cell 52. Lower bound comparator 58 is coupled to SRAM cell 54 to receive lower bound values from SRAM cell 54. Sensing device 55 is a conventional sense amplifier coupled to read the contents of upper bound and lower bound bits stored in SRAM cells 52, 54.

In operation, a search for a matching BAM word 102(a)–(n) in the BAM device 100 in accordance with an embodiment of the present invention occurs in the following manner. An $n^{th}$ bit of the input data on input signal line 70 is provided to both upper bound comparator 56 and lower bound comparator 58. Upper bound comparator 56 compares the $n^{th}$ bit of the input signal with a corresponding bit of the upper bound value stored in SRAM 52. Simultaneously, lower bound comparator 58 compares the $n^{th}$ bit of the input signal with a corresponding bit of the lower bound value stored in SRAM 54. Equal in signal from higher order bits is provided on signal line 60 to the upper bound comparator 56 and Equal in signal is provided on signal line 67 to the lower bound 58 comparator. Each Equal in signal provided on signal lines 60, 67 indicates that each bit of an order higher than $n^{th}$ bit of the input data is equal to its corresponding bit stored in SRAM 52, 54.

In the preferred embodiment, comparisons are performed in each BAM cell 50(a)–(n) and propagate in a daisy chain all the way from the highest order bit to the lowest order bit. If the result of the comparisons performed in BAM cell 50(n) is "equal", i.e., each bit of an order higher than the $n^{th}$ bit of the input data is equal to its corresponding bit stored in SRAM 52, 54, lower bound comparator 58 asserts a high Equal out signal on signal line 90 to the next BAM cell 50. Likewise, upper bound comparator 56 asserts a high Equal out signal on signal line 99 to the next BAM cell 50. If the result of the comparisons performed in BAM cell 50(n) is "less than or equal", upper bound comparator 56 asserts a high signal on signal line 62 (shown in FIG. 2) and lower order bits are disabled from comparisons. Likewise, if the result of the comparisons performed in BAM cell 50(n) is "greater than or equal", low bound comparator 58 asserts a high signal on signal line 64 (shown in FIG. 2) and low order bits are disabled from comparisons. One of skilled in the art would recognize that comparisons are performed simultaneously in each BAM word module 102(a)–102(n) of BAM array 100.

Figure 4:
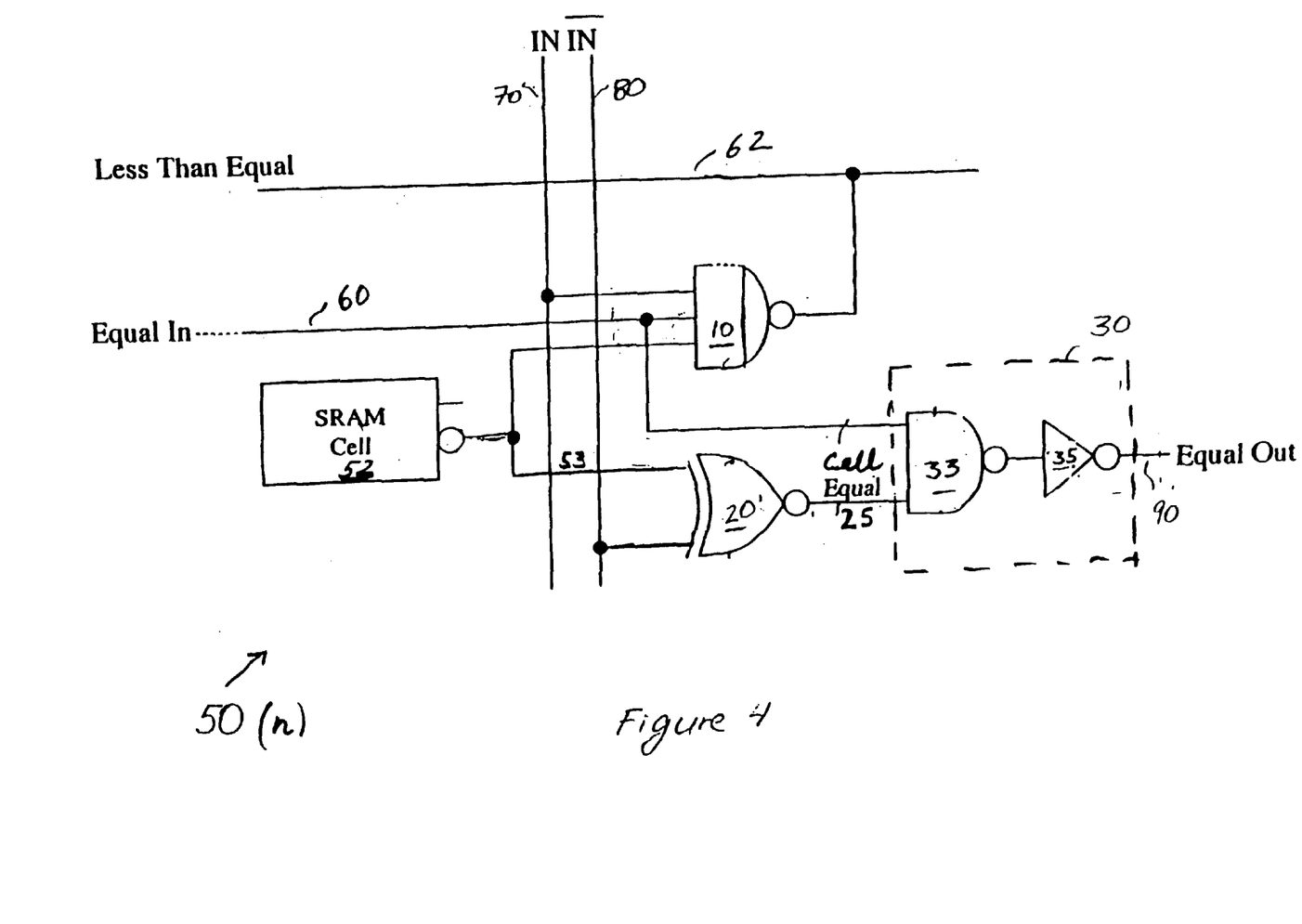
FIG. 4 is a gate-level implementation of an upper bound portion of the BAM cell of FIG. 3.

Referring now to FIG. 4, a gate-level implementation of an upper bound portion of BAM cell 50(n) described in connection with FIG. 3 is shown. The upper bound portion of BAM cell 50(n) includes upper bound comparator 56 and SRAM cell 52. In one embodiment of the present invention, upper bound comparator 56 is implemented as a NAND gate 10 for performing "Less Than Equal" comparison, an exclusive NOR gate 20 for performing "Equal" comparison, and an AND gate 30 for performing an AND operation and for outputting an equal out signal on respective signal line 90 to the next BAM cell 50. In the preferred embodiment, AND gate 30 is implemented as an NAND gate 33 and an inverter 35. In another embodiment (not shown), AND gate 30 is implemented as an AND gate.

NAND gate 10 has three inputs. A first input is coupled to input signal line 70 for receiving the $n^{th}$ bit of the input data. A second input is coupled to signal line 60 for receiving Equal in signal (a check bit signal). When Equal out signal is high it indicates that each bit of an order higher than the current input bit is equal to the corresponding bit of the upper bound value stored in SRAM 52. A third input of NAND gate 10 is coupled to signal line 53 for receiving an inverted output of SRAM 52. The drain of NAND gate 10 is coupled to less than equal signal line 62. Less than equal signal line 62 is a wired OR line that asserts a less than equal signal on its output.

Exclusive NOR gate 20 has two inputs. A first input of the exclusive NOR gate 20 is coupled to input signal line 80 to receive an inverted $n^{th}$ bit of the input signal. A second input of the exclusive NOR gate 20 is coupled to receive an inverted output of SRAM 52 on signal line 53. An output of the exclusive NOR gate 20 asserts a Cell equal signal on signal line 25.

AND gate 30 has two inputs. A first input is coupled to signal line 60 for receiving Equal in signal. A second input is coupled to cell equal signal line 25 for receiving the output of XNOR gate 20 (cell equal signal). AND gate 30 asserts equal out signal on signal line 90. It should be understood that "Less Than Equal" and "Equal" line of comparisons are performed simultaneously.

In a preferred embodiment, comparisons are performed in the following manner.

1. Signals Are Equal

The $n^{th}$ bit of the input data provided on input signal line 70 and the $n^{th}$ stored bit are equal (both have a value of a logic one or a logic zero). Equal in signal on signal line 62 is high. NAND gate 10 receives the following signals on its inputs: input signal on signal line 70; output of SRAM 52 on signal line 53; and equal in signal on signal line 60. NAND gate 10 performs an NAND function and asserts a high signal on signal line 62.

Simultaneously to the comparison performed by NAND gate 10, exclusive NOR gate 20 receives the output of SRAM 52 on signal line 53 and an inverted input signal on signal line 80 and performs the "equal to" line of comparisons. Since both the input signal and the output of SRAM 52 are equal, XNOR gate 20 asserts a high cell equal signal on signal line 25. The cell equal signal indicates that if both signals are equal (both have a logic value of "1" or "0"), then the result of the comparison for this particular cell is "Equal." AND gate 30 receives Cell equal signal on signal line 25 and high Equal in signal on signal line 60 and performs an AND function on both signals. AND gate 10 asserts a high Equal out signal on signal line 90. The Equal out signal indicates that all previous BAM cells are "equal" and the current comparison is "equal." As a result, Equal out signal is thrown into Equal In signal and the comparison propagates to the next significant bit (BAM cell 50) until the input signal on the signal line 70 is less than the upper bound value or greater than the upper bound value stored in SRAM 52.

2. Less Than Equal

When the input signal on signal line 70 is logic zero and the output of SRAM 52 is logic one, NAND gate 10 receives a high Equal in signal on signal line 62, a low output of SRAM 52 on signal line 53, and a low input signal on signal line 70. NAND gate 10 asserts a high less than equal signal on signal line 62 after performing a NAND operation.

Simultaneously to the comparison performed by NAND gate 10, exclusive NOR gate 20 receives the inverted input signal on signal line 80 and the inverted output 53 of SRAM 52 on signal line 430 and performs the "equal to" line of comparisons. XNOR gate 20 asserts a low Cell equal signal on signal line 25 after performing the exclusive NOR function. AND gate 30 receives on its input a low Cell equal on signal line 25 and high Equal in signal on signal line 60 and performs an AND function on both signals. AND gate 30 asserts a low Equal out signal on signal line 90.

As a result of this comparison, the input signal is not greater or equal than the stored signal provided at the output of SRAM 52. Less than equal signal on signal line 62 remains high and all lower order bits are disabled from propagation. Logic gate 15($n$), which is shown in FIGS. 1, 2 receives high less than equal signal on signal line 62.

3. Greater Than

The input signal on signal line 70 is a logic one, the output of SRAM 52 on signal line 53 is logic one, and equal in signal on signal line 60 is logic one. NAND 10 performs an NAND function on the three signals and asserts a low signal on signal line 62. This signal indicates that the input signal is greater than the bit stored in SRAM 52. As a result, all lower order bits are disabled from propagation and logic gate 15 receives a low less than equal signal on signal line 62, as shown in FIGS. 1, 2.

Table 1 illustrates situations when the input bit is equal to the stored upper bound bit, not greater than the stored upper bound bit, and greater than the stored upper bound bit.

TABLE 1

Diagram of Comparisons Performed in the Lower portion of the BAM cell 50(n).

| IN | IN_N | SRAM | SRAM bar | Equal In | Inputs on NAND gate | Less Than Equal | Inputs on XNOR gate | Cell Equal | Inputs on AND gate | Equal Out |
|---|---|---|---|---|---|---|---|---|---|---|
| 0 | 1 | 0 | 1 | 1 | 0,1,1 | 1 | 1,1 | 1 | 1,1 | Equal Out = Equal in |
| 1 | 0 | 1 | 0 | 1 | 1,1,0 | 1 | 0,0 | 1 | 1,1 | Equal Out = Equal in |
| 0 | 1 | 1 | 0 | 1 | 1,0,0 | 1 | 1,0 | 0 | 0,1 | 0 |
| 1 | 0 | 0 | 1 | 1 | 1,1,1 | 0 | 0,1 | 0 | 1,0 | 0 |

Figure 5:
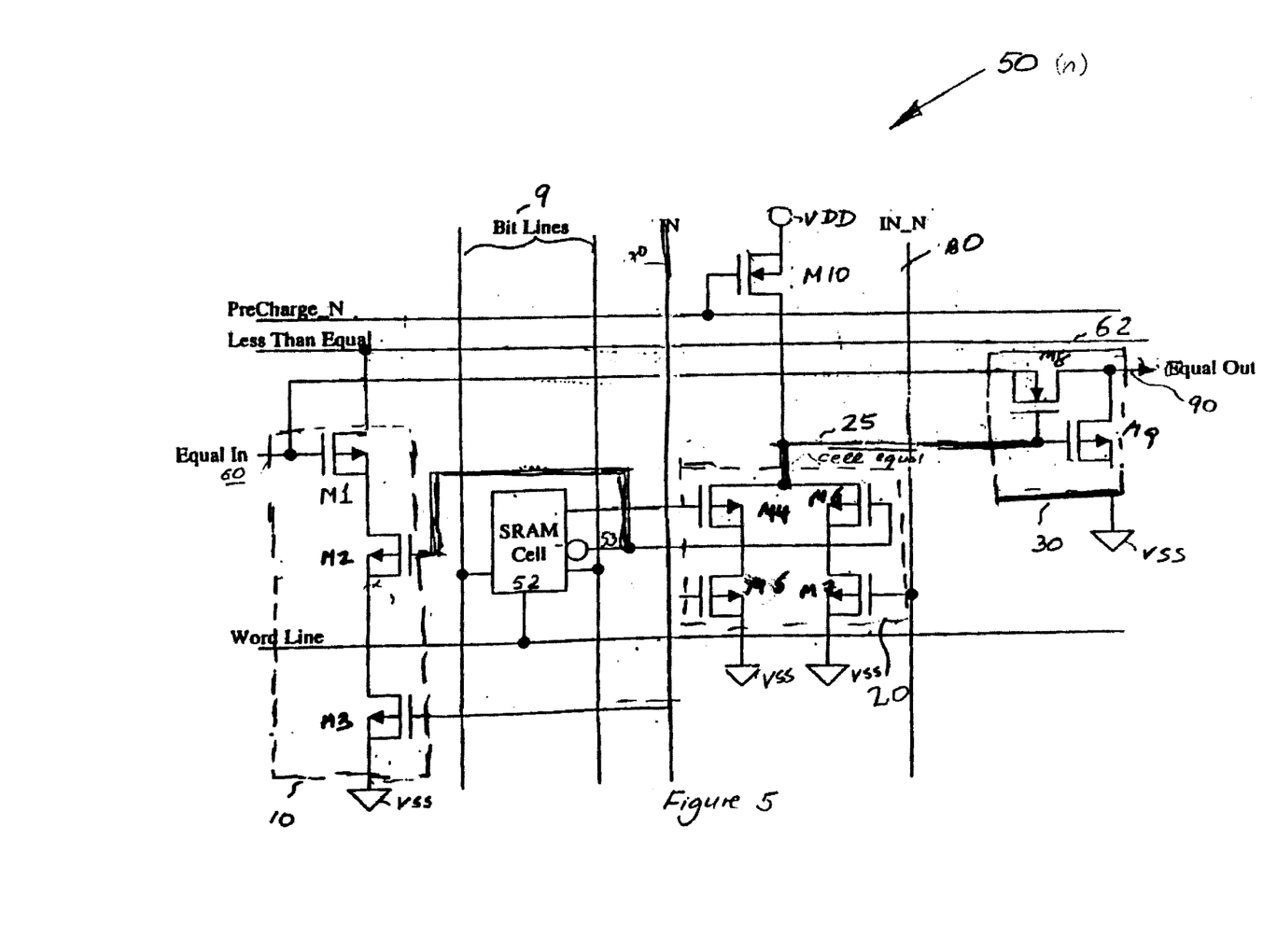
FIG. 5 is a transistor-level implementation of the upper bound portion of the BAM cell of FIG. 3.

It should be understood that the gate-level diagram shown in FIG. 4 could be implemented in any number of possible ways on a transistor level. FIG. 5 shows an exemplary implementation of the gate-level diagram of the upper bound portion of BAM cell 50(*n*). As shown in FIG. 5, functions of NAND gate 10 are implemented as transistors M1, M2, and M3. Functions of XNOR gate 20 are implemented as transistors M4–M7 and M10. Functions of AND gate 30 are implemented as transistors M8 and M9.

Transistors M1, M2, and M3 implement "less than equal" line of logic. The drain of M1 is connected to the less than equal line 62. The source of M1 is connected to the drain of M2. The source of M2 is connected to the drain of M3. Bit lines 9 write an upper bound value to SRAM cell 52. M2 gate receives an inverted output of SRAM cell 52. M3 receives an inverted input signal on signal line 80. The source of M3 is connected to VSS ground.

Functions of XOR gate 20, which is implemented in place of XNOR gate 20 of the embodiment of FIG. 4, are implemented as transistors M4, M5, M6, and M7. These transistors perform "equal" line of comparisons. The source of M4 is connected to the drain of M5. The drain of M4 is connected to the drain of M6. The source of M5 is connected to VSS ground. The source of M6 is connected to the drain of M7. The source of M7 is connected to VSS ground.

Functions of NOR gate 30, which is implemented here in place of AND 30 gate of embodiment of FIG. 4 are implemented as transistors M8 and M9. These transistors perform "equal out" logic. The drain of M8 is connected to the drain of M9. M10 is a transistor used to precondition transistors M4, M5, M6, and M7. M10 transistor is connected to the drain of M4 and to the drain of M6. The source of M10 is connected to VDD. It should be noted that transistors M8 and M10 are implemented as PMOS transistors. All remaining transistors are implemented as NMOS transistors.

The embodiment shown in FIG. 5 advantageously allows BAM array 100 to perform range checking in one cycle. A cycle is divided into three stages: a preconditioning stage during which all assumptions are established, a comparison stage during which all the assumptions are validated or invalidated, and a reconditioning stage.

During the preconditioning stage of the cycle, the following signals are preferable preconditioned: less than equal signal on signal line 62; cell equal bar signal on signal line 25; and the input signal on signal lines 70 and 80. In the preferred embodiment, input signals on signal lines 70 and 80 are precharged to low to conserve power consumption. After the input signals are precharged, they are allowed to go to their initial state. In the preferred embodiment, less than equal signal on signal line 62 will be assumed to be high (a logic one) indicating that the input signal on signal line 70 is not greater than the corresponding stored bit in SRAM 52. PMOS transistor M10 preconditions cell equal bar signal on signal line 25 so that it will be assumed to be high (a logic one), thereby indicating that the input signal on signal line 70 is not equal to the stored bit. One skilled in the art would understand that any PMOS transistor can be used to precondition the signal on less than equal signal line 62. In an alternative embodiment, less than equal signal on signal line 62 is preconditioned to a low value. Thus, it will be assumed that the input signal is not less than the bit stored in SRAM 52. Likewise, cell equal bar signal on signal line 25 is preconditioned to low, thereby indicating that the stored bit is equal to the $n^{th}$ bit of the input data.

During the comparison stage, which follows the preconditioning stage, all of the comparisons are performed and the assumptions established in the first stage are either invalidated or validated.

1. Signals Are Equal

Both input signal on signal line 70 and a bit stored in SRAM 52 are equal. Transistors M1–M3 that perform an NAND function assert a high signal on signal line 62. Thus, the initial assumption indicating that the input signal is not greater than the bit stored in SRAM 52 is validated. Transistors M4–M7, which perform functions of a NOR gate, output a low Cell equal bar signal on signal line 25, thereby invalidating the initial assumption that both signals are not equal. Transistors M8 and M9, which perform an AND function, output a high Cell equal out signal on signal line 90 indicating that the $n^{th}$ bit of the input data is equal to the $n^{th}$ stored bit and the result of the previous comparison is "equal." As a result, Equal out signal is thrown into Equal In signal and comparisons propagate to the next BAM cell 50(*n*) to perform comparisons for the next low order bit until the input signal on signal line 70 is greater or not greater than the signal provided on the output of SRAM 52.

2. Less Than Equal

The input signal on signal line 70 has a value of a logic zero, the bit stored in SRAM 52 is a logic one, and the signal on equal in line 60 is high. Transistors M1–M3 assert a high signal on signal line 62 after performing an AND function, thereby validating the initial assumption. Simultaneously, transistors M4–M7 output a high cell equal bar signal on signal line 25, thereby validating the initial assumption stating that both signals are not equal. M8 and M9 receive a high equal in signal on signal line 60 and a high cell equal bar signal on signal line 25 and output a low cell equal out signal on signal line 90.

As a result, a high less than equal signal indicating that the input signal is not greater than the bit stored in SRAM 52 is provided on signal line 62 to logic gate 15(*n*) shown in FIGS. 1, 2, and lower order bits are disabled from propagation.

3. Greater Than

The input signal has a value of a logic one, the stored SRAM bit has a value of a logic zero, and equal in signal provided on signal line 60. Transistors M1–M3 perform a NAND function on the three signals. As a result of the NAND operation, M1–M3 assert a low signal on signal line 62, thereby indicating that the initial assumption is wrong, i.e., the input signal is greater than the stored bit. Logic gate 15(*a*)–(*n*) shown in FIGS. 1, 2 receives a low signal on less than equal signal line 62 signal. The comparisons of all lower order bits in BAM word module 102(*n*) is suspended.

When the initial assumptions are invalidated, all signals that were preconditioned in the preconditioning stage are reconditioned during the reconditioning stage so that their respective values are changed from 'high' to 'low' or from 'low' to 'high.'

Simultaneously to the comparisons performed in the upper bound portion of BAM cell 50(*n*), comparisons are performed in the lower bound portion of BAM cell 50(*n*). These comparisons are described below in more detail in connection with FIGS. 6 and 7.

Figure 6:
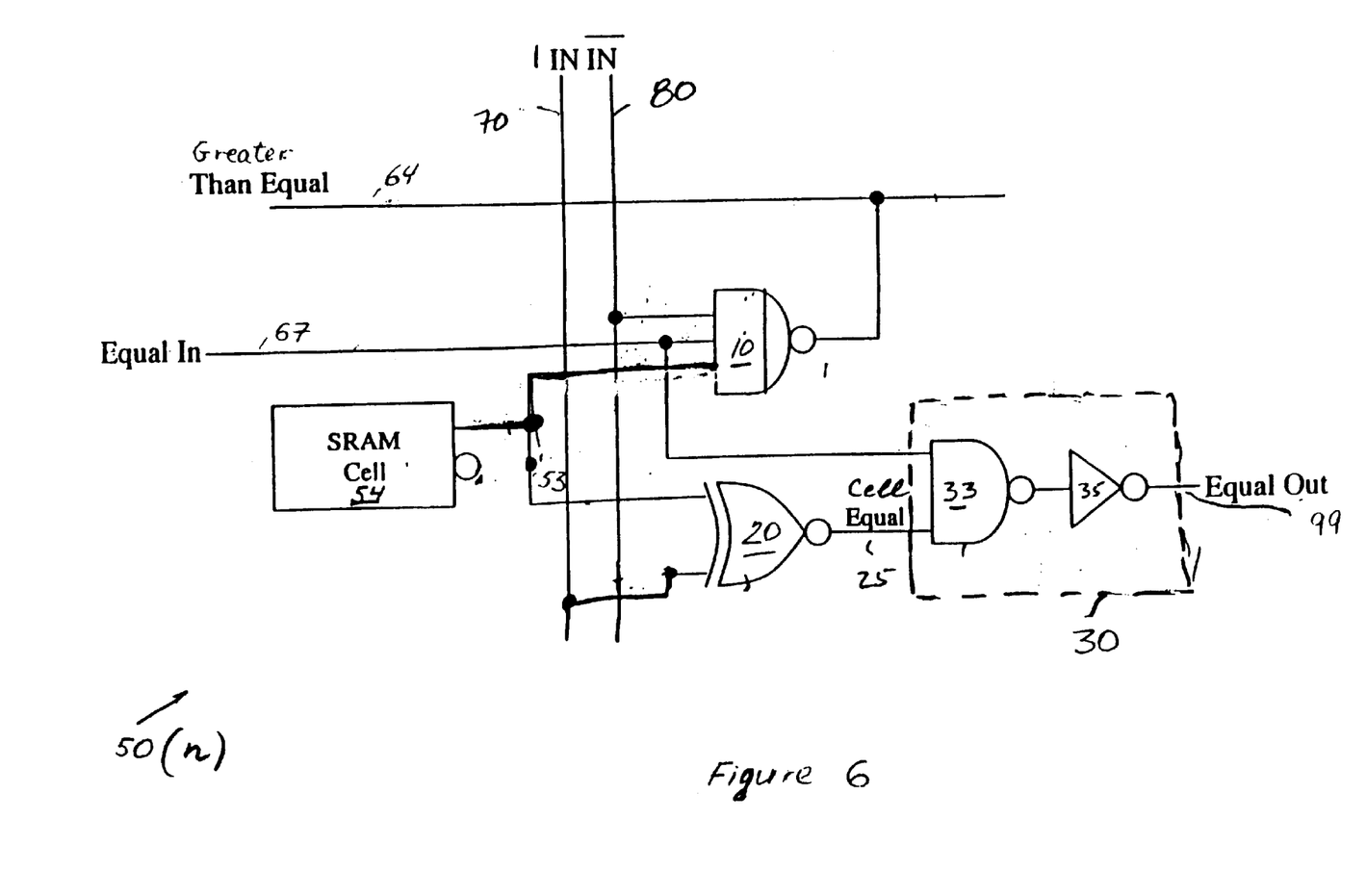
FIG. 6 is a gate-level implementation of a lower bound portion of the BAM cell of FIG. 3.

Referring now to FIG. 6, a gate-level implementation of a lower portion of BAM cell 50(*n*) is shown. Lower bound portion of BAM cell 50(*n*) includes lower bound comparator 58 and SRAM cell 54. It should be noted that gate-level implementation of the lower portion of BAM cell 50(*n*) is similar to the implementation of the upper bound portion of BAM cell 50(*n*). The following are some of the differences between the gate level implementation of the upper bound portion of BAM cell 50(*n*) and lower bound portion of BAM cell 50(*n*): NAND gate 10 receives the $n^{th}$ bit of the input signal on signal line 70, an inverted bit stored in SRAM cell 54, and equal in signal 67. Lower bound comparator 58 performs "greater than equal to" comparison. SRAM cell 54 stores a lower bound value. In operation, as implemented in the preferred embodiment, if the $n^{th}$ bit of the input signal is not less than the $n^{th}$ bit stored in SRAM 54 and equal in signal 67 is true (i.e., each bit of a higher order is equal to its corresponding stored bit), then greater than equal signal line 64 is pulled low and any further propagation is suspended. If, in contrast, the $n^{th}$ bit of the input signal is not less than the $n^{th}$ stored bit, then greater than equal signal line 64 remains high and all propagation to lower order bits is suspended.

"Equal to" comparison of the lower portion of BAM cell 50(n) is implemented in a similar manner as "equal to" function of the upper portion of BAM cell 50(n). The following are some of the differences: XNOR gate 20 receives the $n^{th}$ bit of the input signal on signal line 70 and a bit stored in SRAM 54. In the gate-level implementation of the upper bound portion of BAM cell 50(n), XNOR gate 20 receives an inverted input signal on signal line 80 and an inverted bit stored in SRAM 54.

A diagram of comparisons performed in the upper bound portion of the BAM cell 50(n) would look similar to Table 1, except that it would show situations when the input bit is equal to the stored lower bound bit, not less than the stored lower bound bit and less than the stored upper bound bit.

Figure 7:
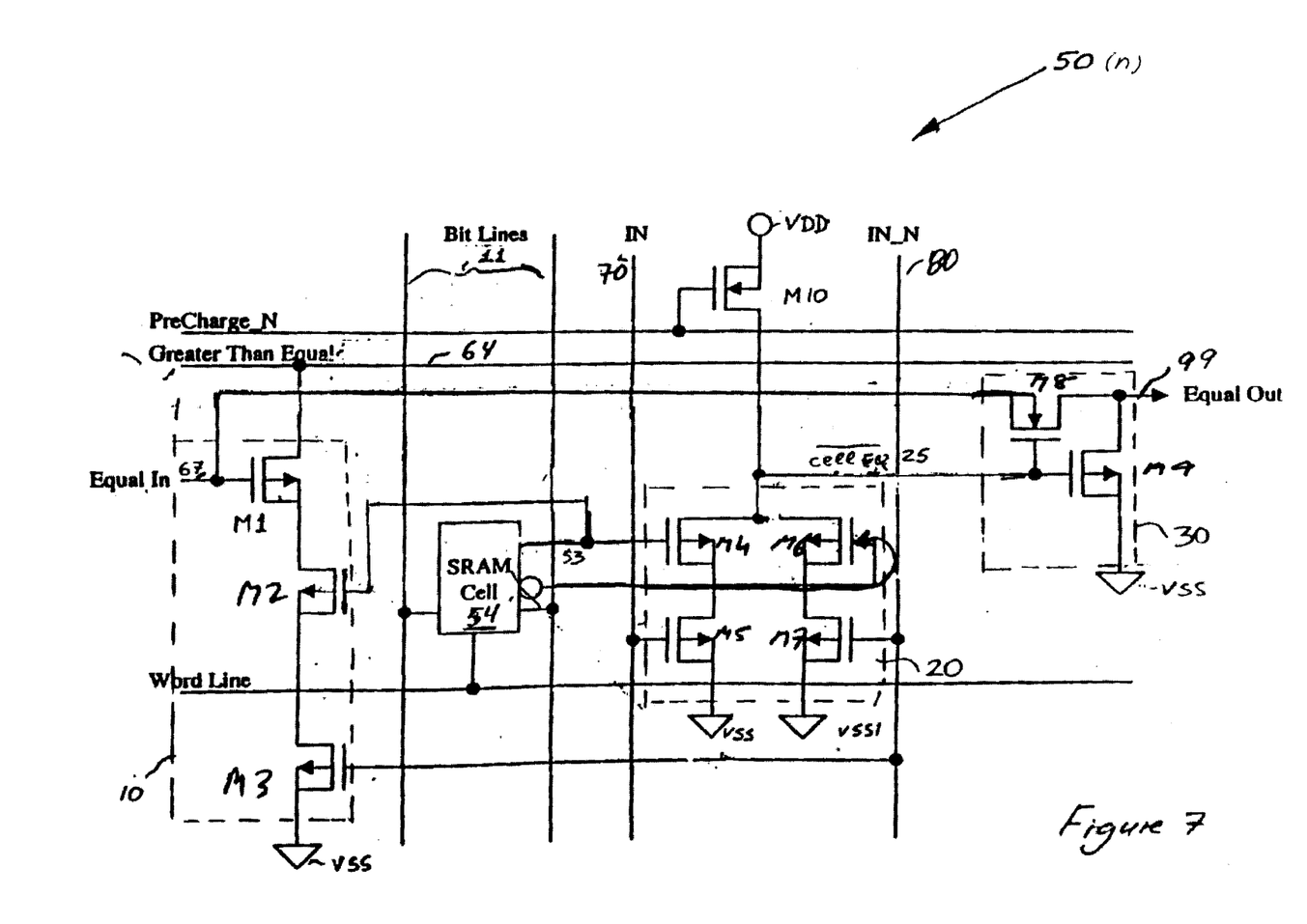
FIG. 7 is a transistor-level implementation of the lower bound portion of the BAM cell of FIG. 3.

Referring now to FIG. 7, there is shown a transistor-level implementation of the gate-level diagram of the lower bound portion of BAM cell 50(n). The lower portion of BAM cell 50(n) is implemented in the same manner as the upper portion of BAM cell 50(n), except for some differences. For example, lower bound comparator 58 of the lower portion of BAM cell 50(n) performs greater than equal comparison. During the preconditioning stage, greater than equal signal line 64 is preconditioned high by a PMOS transistor (not shown). Bit lines 11 write lower bound value to SRAM cell 54. Transistor M2 receives a bit stored in SRAM 54 and M6 receives an inverted bit. M3 receives in inverted input signal on signal line 80, and M5 receives the input signal on signal line 70. "Equal" logic of the lower portion of BAM cell 50(n) is implemented similarly to "equal" logic of the upper portion of BAM cell 50(n).

If the initial assumption is invalidated, greater than equal signal line 64 and cell equal bar signal line 25 are reconditioned during the reconditioning stage so that their respective values are changed from 'high' to 'low' or from 'low' to 'high.' It should be understood that preconditioning of signals might be accomplished by precharging them to a high or a low value. Similarly, reconditioning of signals may be accomplished by discharging them to a high or a low value.

If as a result of the comparison, the $n^{th}$ bit of the input signal is equal to the $n^{th}$ bit of the lower bound value, the comparisons propagates to a next $n^{th}$ bit (BAM cell 50). Alternatively, the comparisons in the remaining BAM cells 50 are suspended and either high or low greater than equal signal is provided to logic gate 15(a)–(n) on signal line 64 (shown in FIG. 2).

Figure 8:
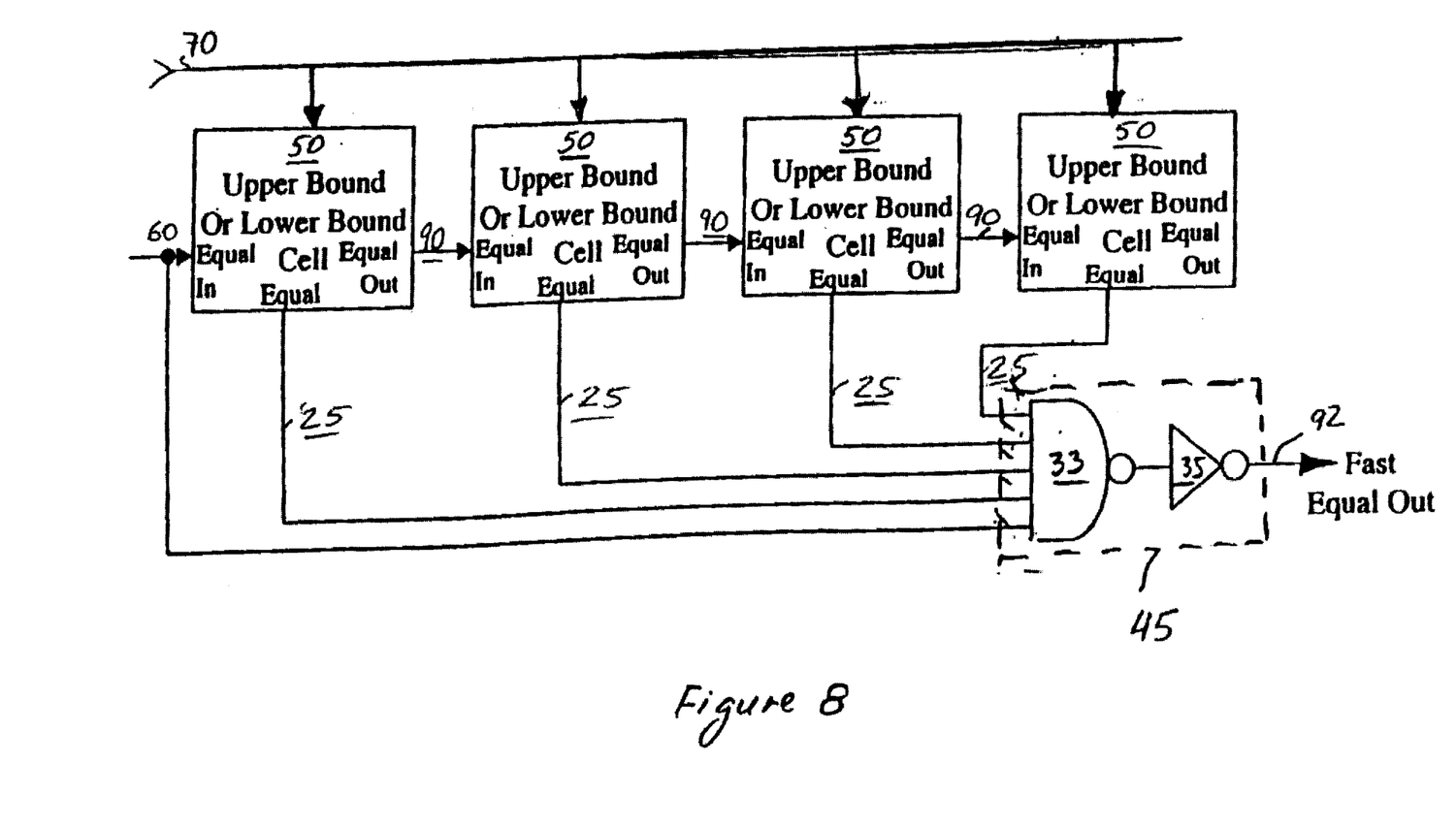
FIG. 8 is a high-level block diagram of a look-ahead equal circuit of the embodiments of FIGS. 4 and 6.

FIG. 8 is a block diagram of a look-ahead equal circuit 45 coupled to BAM word 102(n) of the embodiment of FIG. 2. In the preferred embodiment, BAM word module 102(a)–(n)(shown in FIGS. 1 and 2) is 32-bit wide and thus would have 32 BAM cells 50. In one embodiment of the present invention, look-ahead circuit 45 evaluates four bits at a time. However, one skilled in the art would understand that look-ahead circuit 45 could evaluate any number of bits at a time. As shown in FIG. 8, four upper bound portions or lower bound portions of BAM cell 50(n) are connected to each other. Each BAM cell 50(n) outputs Cell equal out signal on signal line 25. In a preferred embodiment, look-ahead circuit 45 is a five-input AND gate, which is formed by NAND gate 33 and an inverter 35. Look-ahead circuit 45 is coupled to signal lines 25 to receive Cell equal out signals from four BAM cells 50. Look-ahead circuit 45 is further coupled to equal in signal line 60 to receive Equal in signal. Look-ahead circuit 45 determines whether the four bits of the input signal provided on signal line 70 are equal to the corresponding four bits of upper bound values or lower bound values stored in SRAM cells 52 and 54 respectively (not shown in FIG. 8) and outputs a Fast Equal out signal on a respective signal line 92. The preferred implementation of circuit 45 requires eight propagations to generate Fast equal out signal on signal line 92 to the next four BAM cells 50.

Figure 9:
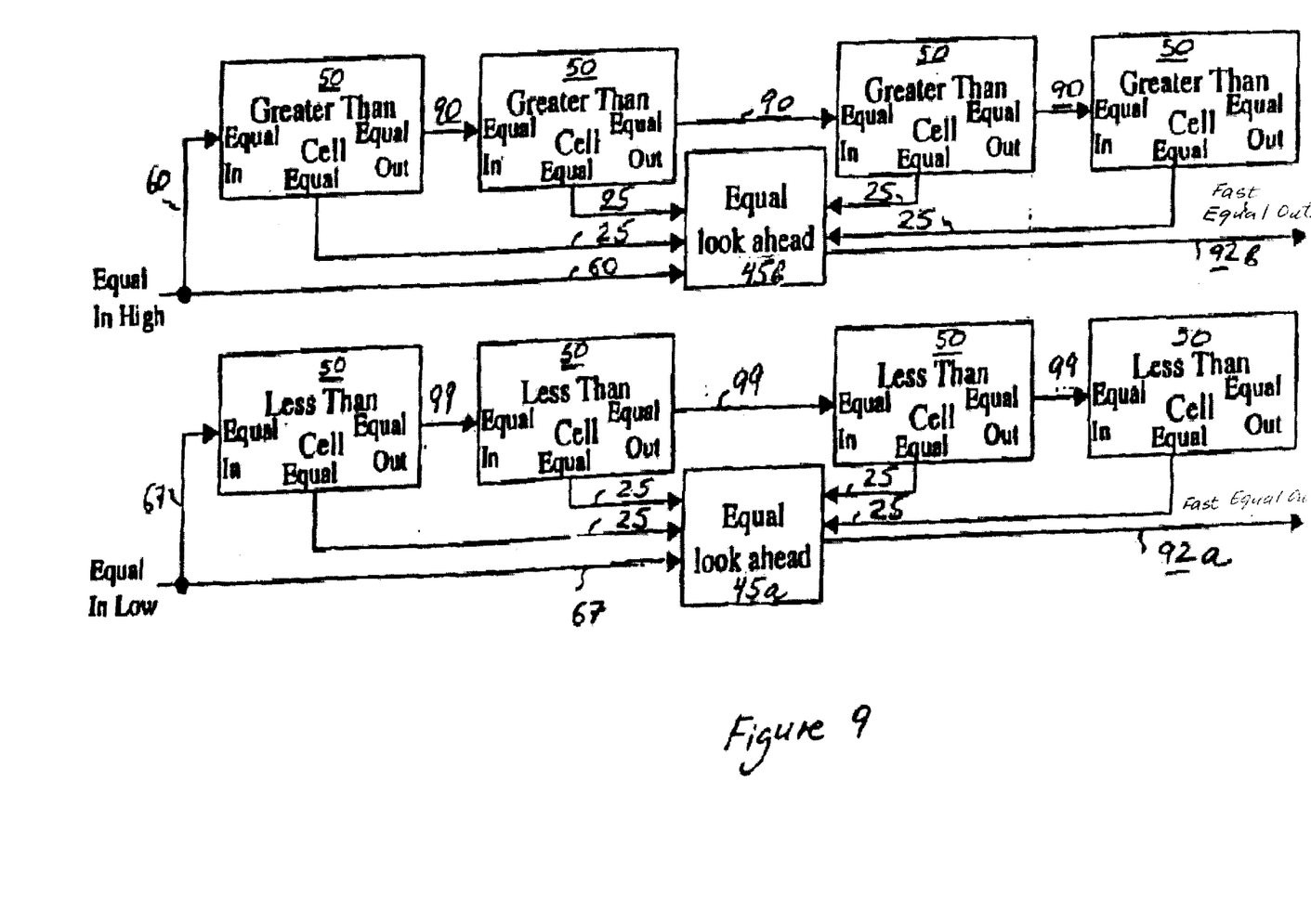
FIG. 9 is a block diagram of the look-ahead circuit of FIG. 8 implemented with both an upper bound comparator and a lower bound comparator stacked together.

An advantage of equal look-ahead circuit 45 is in the reduction of logic that each equal out signal has to go through. Thus, rather than waiting for a serial change to propagate from the highest order bit to the lowest order bit, four cell equal signals are generated in parallel for each upper bound portion or lower bound portion of BAM cell 50(n) regardless whether higher order bits are equal. This propagation speed is achieved for the cost of the additional five-input AND gate 45. One skilled in the art would recognize that BAM device 100 could have more than one look-ahead circuit 45. Thus, FIG. 9 illustrates two equal look-ahead circuits 45a and 45b for propagating more than one Fast equal out signals on signal lines 92a and 92b respectively.

Figure 10:
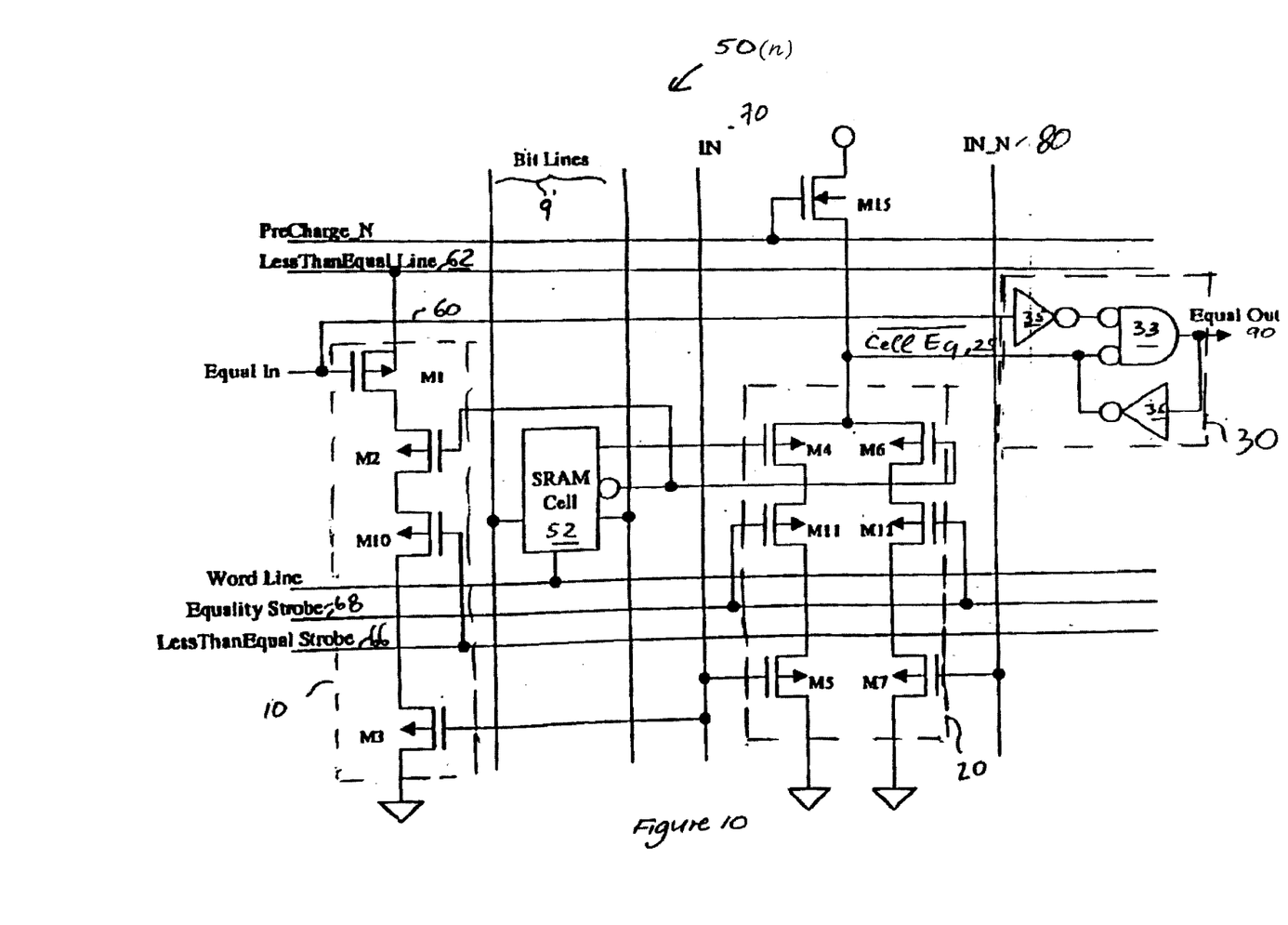
FIG. 10 is a transistor-level implementation of an upper bound portion of a low power BAM cell.

Referring now to FIG. 10, there is shown another transistor-level implementation of the upper bound portion of a low power BAM cell 50(n) of FIG. 3. Upper bound portion of BAM cell 50(n) includes SRAM cell 52, NAND gate 10, XNOR gate 20, and NOR gate 30. NAND gate 10 is implemented as transistors M1, M2, M3 and M10. The drain of M3 is connected to the Less Than Equal line 62. The source of M1 is connected to the drain of M2. Transistor M10 is inserted between transistors M2 and M3, so that the source of M2 is connected to the drain of M10. M2 gate is connected to the inverted output of SRAM cell 52. The source of M3 is connected to VSS ground. XNOR gate 20 is implemented as transistors M4, M5, M6, M7, M11, and M12. Transistor M11 is inserted between transistors M4 and M5. Transistor M12 is inserted between transistors M6 and M7. The source of M4 is connected to the drain of M11. The drain of M4 is connected to the drain of M6. The source of M5 is connected to VSS ground. The source of M6 is connected to the drain of M7. The source of M7 is connected to VSS ground. M15 is a pre-charge transistor, which is connected to the drain of M4 and to the drain of M6. The source of M10 is connected to VDD. It should be noted that transistor M15 is implemented as PMOS transistors. All remaining transistors are implemented as NMOS transistors.

In operation, when equality strobe 68 is asserted, transistors M11 and M12 are on. Input signal is provided to transistors M5 and M7 on signal lines 70 and 80. The output of SRAM 52 is provided to transistors M4 and M6 on signal line 53. Transistors M11–M12 and M4–M7 evaluate whether the $n^{th}$ bit of the input signal is equal to signal provided on the output of SRAM 52 and assert a Cell equal bar signal on signal line 25. NAND gate 33 is coupled to receive an inverted cell equal bar signal (cell equal) on signal line 25 and equal in signal on signal line 60. Equal in signal 60 is inverted twice before it is provided on the input of NAND gate 33. The output of NAND gate 33 is Equal out signal indicating that the previous comparisons are equal and comparisons performed in this BAM cell 50(n) are equal.

After equal comparisons are performed, less than equal strobe 66 is asserted, thereby turning transistor M10 on. When transistor M10 is on, it is determined whether the $n^{th}$ bit of the input signal is no greater than the signal provided on the output of SRAM 52. Thus, in this embodiment, unlike in the preferred embodiment where all comparisons are performed simultaneously, all of the evaluations are performed only when "equality" strobe, "less than equal" strobe or "greater than equal" strobes are asserted. The embodiment shown in FIG. 10 is advantageous because the use of the equality strobe allows the equal signal provided on signal line 25 to propagate daisy chain before the less than or greater than comparisons are performed.

It should be noted that in the preferred embodiment, during a precharge stage, the input signals provided on signal lines 70 and 80 are precharged to zero. After preconditioning stage, these signals are allowed to go to their initial state. In this embodiment, the input signals do not need to be preconditioned during a pre-charge stage so that they can go to any state.

Figure 11:
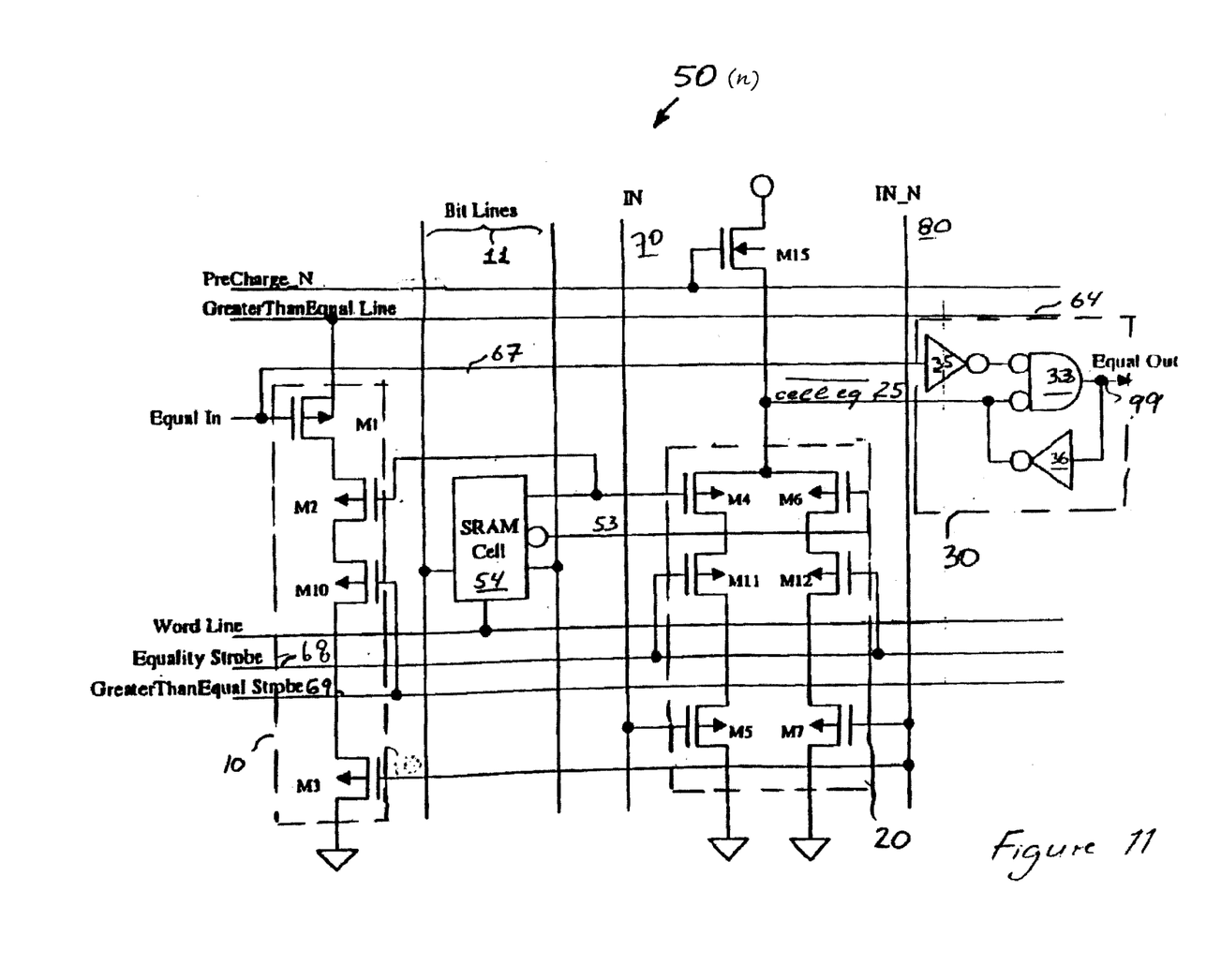
FIG. 11 is a transistor-level implementation of a lower bound portion of a low power BAM cell.

FIG. 11 shows a transistor-level implementation of the lower bound portion of the low power BAM cell 50(n) of FIG. 3. The lower portion of low power BAM cell 50(n) is implemented in a similar manner as the upper bound portion of the low power BAM cell 50(n). Unlike the upper bound portion of BAM cell 50(n), the lower portion performs greater than equal comparisons.

Figure 12:
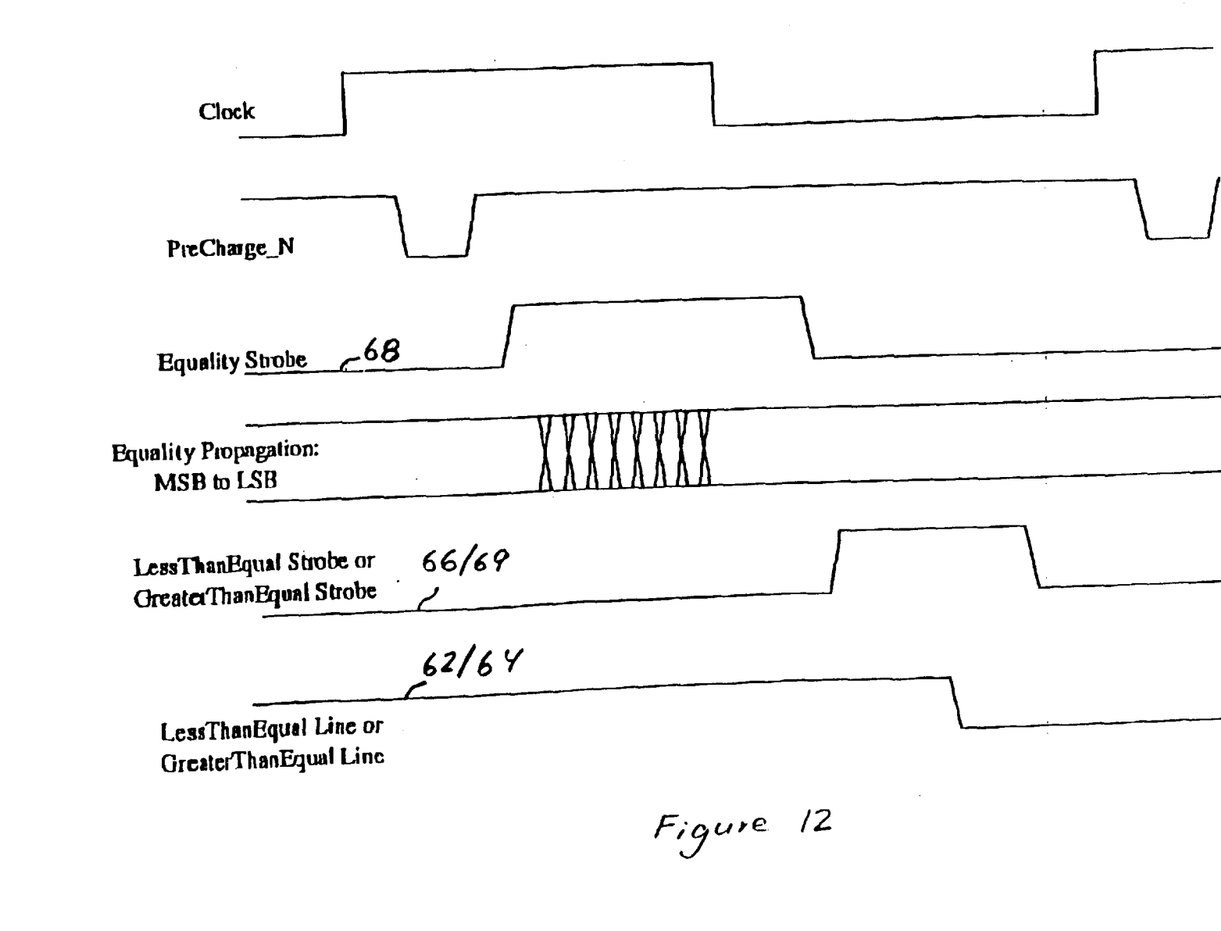
FIG. 12 is a BAM cell-timing diagram of the embodiments of FIGS. 10 and 11.

Referring now to FIG. 12, a timing diagram of low power BAM cell 50(n) illustrating a relationship between signals of the embodiments of FIGS. 10 and 11 is shown. First, during a precharge stage, cell equal signal provided on signal line 25 is preferably precharged by transistor M15. Less than equal signal line 62 and greater than equal signal line 64 are pre-equality charged by a PMOS transistor (not shown). Then, equality strobe 68 is asserted. Equality strobe 68 is a timing signal indicating that all equal calculations need to be performed. After all equal evaluations are performed, either less than equal strobe 66 or greater than equal strobe 69 is asserted indicating that all "Less Than Equal" or "Greater Than Equal" comparisons need to be performed.

What is claimed is:

1. A boundary addressable memory (BAM) device comprising:
    an arrangement of BAM word modules, each BAM word module for performing arithmetic comparisons between input data and an upper bound value stored in each BAM word and the input data and a lower bound value stored in each BAM word module and for generating a plurality of output signals, responsive to the comparisons; and
    a logic gate having inputs and an output, the inputs of the logic gate coupled to receive the outputs of each BAM word module and the output of the logic gate is coupled to generate a matching signal indicating whether the input data is not greater than the upper bound value and not less than the lower bound value or the input data is not greater than the lower bound value and not less than the upper bound value.

2. The device of claim 1, wherein each BAM word module further comprises a plurality of BAM cells and wherein each BAM cell further comprises:
    at least two memory cells for storing the upper bound value and the lower bound value;
    a first comparator for comparing the input data with the upper bound value, the first comparator having inputs and outputs, the inputs of the first comparator coupled to receive the input data and the upper bound value and the output of the first comparator coupled to the logic gate;
    a second comparator, for comparing the input data with the lower bound value, the second comparator having inputs and outputs, the inputs of the second comparator coupled to receive the input data and the lower bound value and the outputs of the second comparator coupled to the logic gate.

3. The device of claim 1, wherein each memory cell is an SRAM cell.

4. A boundary addressable memory (BAM) cell, comprising:
    a first preconditioning logic for preconditioning a first compare signal to a first state;
    a first logic coupled to the first preconditioning logic, the first logic having a first input, a second input, a third input, and an output, the first input coupled to an equal in signal line for receiving a first check bit, the second input coupled to a signal line for receiving a stored bit, the third input is coupled to the input signal line for receiving the input signal, the first logic for comparing the input bit with the stored bit and for validating the first compare signal, based on the comparison, by indicating whether the first state of the first compare signal is correct;
    a second preconditioning logic, coupled to the first logic, for preconditioning a second compare signal to a second state;
    a second logic, coupled to the second preconditioning logic, having a first input, a second input, and an output, the first input is coupled to the signal line for receiving the stored bit and the second input is coupled to the input signal line for receiving the input signal, the second logic gate for comparing the input signal and the stored signal and for validating the second compare signal by indicating whether the first state of the second compare signal is correct; and
    a third logic having a first input, a second input, and an output, the first input coupled to the equal in signal line for receiving the check bit, the second input is coupled to the cell equal signal line for receiving the second compare signal, the third logic gate for asserting a second check bit on its output to a next most significant bit indicating whether the second state of the second compare signal is correct and the first check bit is true.

5. The cell of claim 4, wherein stored bit is a most significant bit of the upper bound value.

6. The cell of claim 4, wherein the stored bit is a most significant bit of the lower bound value.

7. The cell of claim 4, wherein the first logic is a NAND gate.

8. The cell of claim 4, wherein the second logic is an XOR gate.

9. The cell of claim 4, wherein the third logic gate is a NOR gate.

10. The cell of claim 4, wherein the third logic gate is a NOR gate.

11. The cell of claim 4, wherein the first state of the first compare signal indicates that the input signal is less than equal to the stored bit.

12. The cell of claim 4, wherein the first state of the first compare signal indicates that the input signal is not less than equal to the stored bit.

13. The cell of claim 4, wherein the first state of the first compare signal indicates that the input signal is greater than equal to the stored bit.

14. The cell of claim 4, wherein the first state of the first compare signal indicates that the input signal is not greater than equal to the stored bit.

15. The cell of claim 4, wherein the second state of the second compare signal indicates that the input signal is equal to the stored bit.

16. The cell of claim 4, wherein the second state of the second compare signal indicates that the input signal is not equal to the stored bit.

17. The cell of claim 4, wherein the first logic implemented as an NMOS transistors.

18. The cell of claim 4, wherein the second logic implemented as an NMOS transistors.

19. The cell of claim 4, wherein the third logic implemented as a PMOS transistor.

20. The cell of claim 4, wherein the third logic implemented as an NMOS transistor.

21. The cell of claim 4, wherein the first and the second preconditioning logic implemented as a PMOS transistor.

22. A method for generating a matching signal in a boundary addressable memory (BAM) device, comprising:

comparing input data to an upper bound value stored in the BAM device and generating a first output indicating whether the input data is not greater than the upper bound value;

comparing the input data to a lower bound value stored in the BAM device and generating a second output indicating whether the input data is not less than the lower bound value; and combining the first output and the second output and generating the matching signal indicating whether the input data is not greater than the upper bound value and not less than the lower bound value.

23. A method for generating a matching signal in a boundary addressable memory (BAM) device, comprising:

comparing input data to an upper bound value stored in the BAM device and generating a first output indicating whether the input data is not less than the upper bound value;

comparing the input data to a lower bound value stored in the BAM device and generating a second output indicating whether the input data is not greater than the lower bound value; and combining the first output and the second output and generating the matching signal indicating whether the input data is not less than the upper bound value and not greater than the lower bound value.

24. A boundary addressable memory (BAM) device comprising:

first comparing means for comparing input data to an upper bound value stored in the BAM device and for generating a first output indicating whether the input data is not less than the upper bound value;

second comparing means for comparing the input data to a lower bound value stored in the BAM device and for generating a second output indicating whether the input data is not greater than the lower bound value; and combining means for combing the first output and the second output and for generating a matching signal indicating whether the input data is not less than the upper bound value and not greater than the lower bound value.

25. A boundary addressable memory (BAM) device comprising:

first comparing means for comparing input data to an upper bound value stored in the BAM device and for generating a first output indicating whether the input data is not greater than the upper bound value;

second comparing means for comparing the input data to a lower bound value stored in the BAM device and for generating a second output indicating whether the input data is not less than the lower bound value; and combining means for combining the first output and the second output and for generating a matching signal indicating whether the input data is not greater than the upper bound value and not less than the lower bound value.

* * * * *